United States Patent [19]

Brinker et al.

[11] Patent Number: 4,476,156

[45] Date of Patent: Oct. 9, 1984

[54] LOW TEMPERATURE PROCESS FOR OBTAINING THIN GLASS FILMS

[75] Inventors: C. Jeffrey Brinker; Scott T. Reed, both of Albuquerque, N. Mex.

[73] Assignee: The United States of America as represented by the United States Department of Energy, Washington, D.C.

[21] Appl. No.: 473,845

[22] Filed: Mar. 10, 1983

[51] Int. Cl.$^3$ .......................... B05D 5/12; C03C 17/00
[52] U.S. Cl. ........................................ 427/82; 427/93; 427/126.2; 427/387; 427/376.2; 501/17; 501/20; 65/60.52; 65/60.3; 65/59.5
[58] Field of Search ................ 427/82, 93, 126.2, 387, 427/376.2; 501/17, 20; 65/60.52, 60.3, 59.5

[56] References Cited

U.S. PATENT DOCUMENTS

| | | | |
|---|---|---|---|
| 3,212,929 | 9/1965 | Pliskin et al. | 427/402 |
| 3,416,950 | 12/1968 | Schrader | 65/60.3 |
| 3,504,625 | 4/1970 | Childress | 65/60.3 |
| 3,811,918 | 5/1974 | Levene | 65/60.52 |

OTHER PUBLICATIONS

Brinker et al., "Sol–Gel Derived Antireflective Coatings for Silicon," Solar Energy Materials, 5 (1981), 159–172.

Brinker et al., "Comparisons of Sol–Gel–Derived Thin Films with Monoliths in a Multicomponent Silicon Glass System," Thin Solid Films, 77 (1981).

Brinker et al., "Conversion of Monolithic Gels to Glasses in Multicomponent Silicate Glass System," Journal of Materials Science, 16 (1981).

*Primary Examiner*—John E. Kittle
*Assistant Examiner*—James J. Seidleck
*Attorney, Agent, or Firm*—Armand McMillan; Albert Sopp; Michael F. Esposito

[57] ABSTRACT

A method for coating a substrate with a glass-like film comprises, applying to the substrate an aqueous alcoholic solution containing a polymeric network of partially hydrolyzed metal alkoxide into which network there is incorporated finely powdered glass, whereby there is achieved on the substrate a coherent and adherent initial film; and heating said film to a temperature sufficient to melt said powdered glass component, thereby converting said initial film to a final densified film.

19 Claims, No Drawings

LOW TEMPERATURE PROCESS FOR OBTAINING THIN GLASS FILMS

The U.S. Government has rights in this invention pursuant to Contract DE-AC04-76DP00789 between the U.S. Department of Energy and Western Electric Company.

BACKGROUND OF THE INVENTION

This invention relates to a low-temperature process for preparing thin (e.g., 0.1–100 μm) glass films which can be applied to metal, glass, or ceramic substrates by simple commercial processes such as spraying, dipping or spinning.

Currently, there is much interest in the replacement of organic-polymer-based coatings with glass coatings for use in hostile environments, e.g., high temperature, corrosive, or abrasive environments. The requirements of such a coating include: (1) that it behave like a glass (i.e., be refractory, corrosion resistant, electrically insulating and fully dense and cohesive with no pin holes); (2) that it be sufficiently flexible, for example, to be coated on wire and wound on a coil; and (3) that it be applied at low temperatures compatible with the desired substrate.

The most common methods of applying glass films to metal, glass and ceramic substrates are: (1) enameling or glazing; (2) chemical vapor deposition; and (3) direct immersion in a molten glass. These methods all have significant disadvantages with regard to the preparation of thin, flexible films.

Glazing or enameling processes utilize a slurry typically consisting of clay and feldspars, or a frit (pre-melted glass) and water. This mixture is applied by brushing, spraying, or dipping and is subsequently heated to either remelt the glass or react and melt the glass-forming materials. These methods are obviously quite suitable for the preparation of thick films; however, due to the problems of wetting and adherence, it is virtually impossible to obtain thin, continuous films. When the aqueous suspension is applied to a substrate, there are no mechanisms by which it can chemically react with the substrate to promote adherence and wetting. Therefore, techniques which rely on mechanical adherence (such as picking metal surfaces to cause roughening) or which require high temperatures (i.e., application of dry enamel powders to very hot substrates or flame spraying) have been developed to overcome the adherence and wetting problems. However, multiple coatings are often still required to ensure continuity of the coating. Glazing and enameling processes, therefore, result in thick inflexible coatings which often require high processing temperatures.

In a somewhat related method, U.S. Pat. No. 3,212,929 requires that a glass film be deposited on a substrate using an organic solution containing powdered glass. The method is disadvantageous, inter alia, because it involves many steps, including a centrifugation operation.

Chemical vapor deposition can be used to produce glass films. However, the technique is expensive and, due to low deposition rates, is not particularly well-suited to the continuous production of, for example, glass coated wire. Also, the deposited film is porous and must be reheated to cause densification.

Immersion of substrates in molten glass or drawing them through molten glass does not involve satisfactorily low temperatures and, due to the relatively high viscosity of glass at all but the very highest temperatures, film thicknesses are generally high ($>10$ μm) resulting in rather inflexible films.

A less common method of preparing thin glass films is the sol-gel process disclosed, for example, in Brinker et al, "Sol-Gel Derived Antireflection Coatings for Silicon," Solar Energy Matls. 5(1981) 159–172; and Brinker et al, "Comparisons of Sol-Gel Derived Thin Films with Monoliths in a Multicomponent Silicate Glass System," Thin Solid Films 77(1981) 141–148, whose entire disclosures are incorporated by reference herein. In this process metal alkoxides of network forming cations, e.g., Si, Al, B, Ti, etc. are used as glass precursors. In alcoholic solutions, these alkoxides are partially hydrolyzed and then polymerized to form a glass-like network linked by bridging oxygen atoms. Dilute solutions (2–5 equivalent wt. % oxides) can be applied to metal, glass, and ceramic substrates by dipping, spinning, and spraying operations. When applied to a substrate, the partially hydrolyzed glass-like polymers react chemically with the surface and thus cause complete wetting. This is represented below where a silica-like polymer reacts with the hydroxylated monolayer of a metal, M, to produce direct M—O—Si bonds:

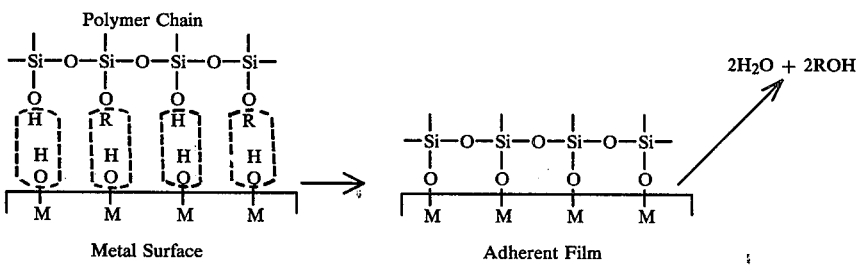

As a result, excellent adherence is achieved. The microporous silica-like polymer film can then be converted to a dense glass film by relatively low-temperature heat treatments, i.e., heat treatments at temperatures much less than the glass softening point as shown, e.g., in Brinker et al, "Conversion of Monolithic Gels to Glasses in a Multicomponent Silicate Glass System," J. Mat. Sci. 16(1981) 1980–1988, whose entire disclosure is incorporated by reference herein.

This sol-gel process has the disadvantage that it can produce only very thin films by a single dipping step (generally less than 0.5 μm). Only by repeated dippings can thicker films be produced; however, the rate of thickness buildup can be very slow and heat treatments between each successive coating are often required.

SUMMARY OF THE INVENTION

Accordingly, it is an object of this invention to provide a method for coating substrates with films of glass-like material.

It is another object of this invention to provide such a method wherein the film is thin, e.g., 0.1–100 μm, and the film is applied in a one-step operation, preferably at a low temperature, e.g., at about 400°–1,000° C.

It is yet another object of this invention to provide such a method which is easy to control with respect to the film thickness, as well as other operating parameters.

Upon further study of the specification and appended claims, further objects and advantages of this invention will become apparent to those skilled in the art.

These objects have been achieved by providing a method for coating a substrate with a glass-like film comprising, applying to the substrate, an aqueous alcholic solution containing a polymeric network of partially hydrolyzed metal alkoxide into which network there is incorporated finely powdered glass, whereby there is achieved on the substrate a coherent and adherent initial film, and heating said film to a temperature sufficient to melt said powdered glass component, thereby achieving on the substrate a final densified film.

In essence, the method of this invention involves the dispersing of a finely powdered pre-melted glass or gel in the sol-gel solutions described above. Accordingly, in this sense, the method of this invention is an improvement of the technique described in the Brinker et al references incorporated by reference above. Unless specific otherwise herein, all details of the process of this invention are fully conventional, e.g., as described in these three Brinker et al references.

DETAILED DISCUSSION

The incorporation of the finely powdered glass into the solutions of the partially hydrolyzed metal alkoxides causes the latter to react with the glass particles, it is theorized, by reactions of the type:

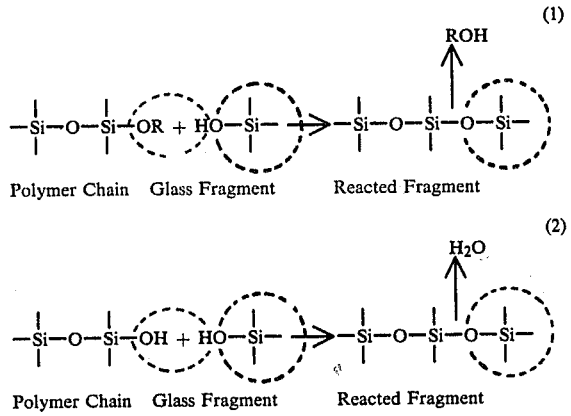

By these reactions, the solution will tend to completely wet the dispersed particles and thus result in a very good dispersion of the suspended phase. After addition of the glass, the polymerized solution containing the dispersed frit can be applied to metal, glass and ceramic substrates by conventional dipping, spraying, or spinning operations. During application, the sol-gel solution phase completely wets and reacts with the substrate and in doing so carries with it the fine powder with which it is chemically bound. On drying, a very uniform and adherent film is formed which consists of a glass-like gel phase surrounding and cementing together the glass frit.

After application, conventional heat treatments can be used to (1) convert the microporous sol-gel glass-like film into a dense glassy film and (2) remelt the applied frit. An advantage of this process is that the "binder" which cements the frit to the substrate and to itself is converted directly to a glass so that it does not burn out to form pores as would an organic binder. Also, the sol-gel material converts rapidly and at a low temperature to form a glass and thus, in combination with a low-melting frit, makes this process suitable for low temperature applications, e.g., when coating a non-refractory substrate, i.e., Al, Cu, Ni, etc.

The composition of the aqueous alcoholic solution containing the polymeric network of partially hydrolyzed metal alkoxide is essentially as described in the prior art, e.g., the Brinker et al references. Suitable metal alkoxides include especially those having alkyl portions of 1–4 carbon atoms. Higher numbers of carbon atoms can also be used, e.g., 6 or 7 carbon atoms; however, the higher the carbon atom number, the more difficult will be the drying of the applied film. Suitable metals in the metal alkoxides include a very wide group of metals, such as those of Groups II, III, and IV of the Periodic Table, as well as the transition metals and other multivalent (e.g., +3, +4, +5, etc.) metals whose alkoxides form three-dimensional polymeric networks upon hydrolysis. Usually, the metal is one like boron, aluminum, titanium, silicon, zirconium, and other ceramic types of metals. Mixtures of metal alkoxides can also be used to tailor the properties of the film to the requirements of the application, as is fully conventional.

Suitable alcohols for use in the solution are lower alkanols, e.g., $C_{1-4}$ alkanols. Often, the alkyl portion of the alcohol will be the same as that of the alkyl portion of the alkoxide. Usually, ethanol or propanol is employed with any alkoxide. However, the precise identity of the alcohol is not critical. In general, as with the alkoxides, the higher the molecular weight of the alcohol, the slower will be the drying process, and the slower will be the polymerization process for the network. It is also possible to use in place of or in addition to the metal alkoxides, combination derivatives of alkoxides and alcohols, such as methoxyethanols, etc.

Optionally, the solution can further comprise system compatible metal salts such as salts of the alkali metals or alkaline earth metals or mercury, etc. with system compatible anions such as nitrates, acetates, etc. These salts are added again to tailor the properties of the resultant film to the desired end use. For example, addition of alkali metals to the blend will lower the glass transition temperature of the final oxide film as is well known. Thus, these salts have a flux-like effect. Again, care should be taken that the salt does not adversely influence the coherency of the finally obtained film. For example, the salt should not be one which will crystallize rapidly upon drying of the film. If rapid crystallization occurred, the film would have a tendency to become heterogeneous.

Normally, acid hydrolysis is used to prepare the partially hydrolyzed alkoxide solution. In this case, the pH is normally in the range of 1–2.5 and is provided by addition of an acid such as hydrochloric acid, nitric acid or equivalents thereof. Basic hydrolysis can also be employed, usually being conducted at a pH of 6-9. Suitable bases are ammonium hydroxide or other equivalent weak bases. More generally, suitable pH's are in the range of 1-9, intermediate pH's being achieved by addition of suitable buffer systems such as acetic acid-/acetate, etc., the precise choice being composition dependent as is fully conventional.

The precise composition of the solution will again be dependent upon the components involved and the final properties desired. Generally, the following relevant proportions will be used: 50-500 g total of metal alkoxide and metal salt, the latter component being provided in an amount of up to 50% of this total; 1,000-10,000 g of alcohol; 10-500 g of water; 10-100 g of powdered glass; and sufficient amounts of acid or base to achieve the mentioned pH's, e.g., normally from a few drops up to about 1 ml of 1N HCL will suffice or up to 3 ml of $NH_4OH$.

Precise amounts can vary outside of these ranges as necessary. For example, the amount of metal salt employed will depend upon the nature of the final property desired. For low temperature melting situations, larger amounts of an alkali metal salt would be employed for example. For thin film applications, larger amounts of alcohol will be provided thereby increasing the dilution of the network structure. The amount of water will be conventionally varied in order to achieve the amount of hydrolysis which is desired. Similarly, the amount of glass used will be selected in accordance with the finally desired properties. Typically, the solution applied to the substrate will have a viscosity in the range of $10^{-1}$ to 15 poise, or up to the gel point of the solution.

The powdered glass, in principle, can be made essentially from any glass. Its precise nature is not critical but, again, will be chosen in accordance with the particular application in mind. Often, the glass will be a conventional silicate or phosphate based glass such as an alkaliborosilicate, an alkalialuminosilicate, etc. There is no significant limitation on the types of glasses which can be employed. For a representative sampling of suitable glasses, see, e.g., "Glass Science" by Doremus, John Wiley & Son, New York (1973). A particularly applicable type of glass is that disclosed in U.S. Pat. No. 2,272,342, which relates to the fabrication of optical fiber preforms. It has particular application since it enables the preparation of very fine dispersions of glass via its flame hydrolysis of tetrachlorides technique.

Typically, the particle size of the glass will be in the range of 200-400 mesh or smaller. Again, the particle size will be chosen in dependence upon the particular application. For example, the smaller the particle size, in general, the lower will be the sintering, i.e., heating temperature required to prepare the final film. Larger particle sizes can often be tolerated, e.g., when there is an adequate distribution of particle sizes within a given range. Particle shapes are not critical, plates, spheres, etc. all being employable.

A unique advantage of the method of this invention is derived from the fact that it enables the use of low temperatures for achievement of the very durable films which are enabled thereby. Accordingly, in a preferred aspect, the powdered glass will be one which has a relatively low temperature glass softening point, e.g., 400° C.-500° C. However, of course, higher melting glasses will be employed in many applications.

The preparation of the coating solutions is essentially conventional except as indicated otherwise herein, and can be routinely optimized by those skilled in the art, perhaps with a few preliminary experiments. In general, initially, the solution of the partially hydrolyzed alkoxide is formed. Conditions are selected to ensure that a precipitate is avoided and that the polymeric network remains in solution. Normally, the solution ingredients are added to the alcohol and then water is added. Typically, one mole of water is employed for each mole of alkoxide in order to achieve a condition where, even if the dehydration and condensation reactions go to completion, the system will remain soluble. The term "partial hydrolysis" is used simply because, in general, not all of the alkoxide groups will be hydrolyzed. Typically, the partial hydrolysis is carried out at a temperature of from room temperature to about 60°-80° C. Surprisingly, it has been discovered that the conventional heating of the solutions can even be eliminated entirely since the hydrolysis goes to completion rapidly at room temperature.

The degree of hydrolysis will be conventionally chosen, e.g., in consideration of the final application. For example, long chains (a higher degree of hydrolysis) will often be preferred when a linear alignment of polymers on the substrate is desired. The degree of hydrolysis is primarily controlled by choice of the amount of water in the solution. Generally, the lower the amount of water and the lower the pH, the lower will be the degree of hydrolysis; the more the amount of water and the higher the pH, the higher will be the degree of hydrolysis. However, degree of hydrolysis per se is not critical.

This solution, without the powdered glass addition described below, can be used to prepare a finely powdered glass which can be used as the powdered glass additive of this invention. This finely powdered glass is simply prepared by permitting the polymer network to grow to a gel and then drying out the partially hydrolyzed solution to produce a porous solid mass. The latter is then ground up to produce a very fine glass powder which is then optionally heated at a temperature lower than its softening point.

For the process of this invention, after formation of the partially hydrolyzed alkoxide solution, the preselected amount of powdered glass will be added. The resultant reaction of the glass with the partially hydrolyzed alkoxide will also be immediate and at room temperature. Thus, again heating is not necessary, but temperatures up to 60°-80° C. can be used as is conventional.

The latter solution is thereafter conventionally applied to a substrate to achieve the advantageous coating of this invention in a one-step, preferably low temperature operation to achieve a readily varied thin coating in the range of 0.1-100 μm, or other thickness as desired. In addition to the low temperature and thickness control, the coatings are also advantageous in that they have higher flexibility than prior art coatings.

The solutions can be applied to the substrate in any conventional fashion such as dipping, spraying or spinning (especially in conjunction with semiconductor substrates).

Illustratively, thickness control can be achieved, e.g., in a dipping operation, by control of any of the following parameters: (1) concentration of glass (the frit); (2) concentration of the sol-gel solution; (3) viscosity of the sol-gel solution; (4) dipping speed; (5) dipping angle;

etc. In a spraying operation, the first three parameters as well as the spraying time can also be used to control thickness.

The amount of solution applied to the substrate in a given operation will be fully conventionally determined, e.g., by conventional consideration of the amount of ingredients in the solution. The solution is normally applied at room temperature but, of course, elevated temperatures can be used in any given application. Similarly, it is also possible to preheat the substrate and then apply the solution thereto. The subsequent film densification heating step is normally conducted at a temperature which is at least as high as the softening point of the powdered glass, usually, at least 400° C. For reasons of economy and convenience, the maximum heating temperature will usually be up to about 50°–100° C. above the glass softening point. This heating step converts the initially applied dielectric-type film to the finally desired impermeable and protective glass-like film.

The application and/or heating steps can be carried out under normal atmospheric conditions. However, when dictated by conventional considerations, these steps can be carried out in an inert, reducing or oxidative atmosphere, or even in vacuo, if necessary.

The applied film dries rapidly. This is a significant advantage for commercial application, e.g., the continuous tank manufacturing technique can be applied.

Of course, if desired, instead of the advantageous one-step application method of this invention, repeated applications can be employed where this is advantageous. Similarly, application methods other than the preferred ones mentioned above can also be used, such as brushing etc.

The films of this invention can be applied to subtrate surfaces where it is desired to render the same insulating, abrasion resistant, impervious etc. The normal application is for protection of the underlying substrate. However, optical applications are also possible by suitable conventional control of the thickness of the layer.

There is essentially no limitation on the substrate surfaces themselves. Metals, glasses, ceramics, semiconductors, etc. can all be coated using the method of this invention. As mentioned, the method is particularly applicable to substrates which are low melting and to which it is normally difficult to apply glass-like coatings since the heretofore required heating step damaged the low melting substrate. Thus, this invention is particularly applicable to substrates such as aluminum, polymers such as Kapton, low melting alloys, etc. Of course, it is equally applicable to higher melting substrates such as those mentioned above, including metals such as copper, nickel, glasses, ceramics, etc. Of course, it is not necessary that the substrate's surface have an available hydroxy group as depicted in the foregoing. Almost all substrates will have at least a monolayer of oxide thereon. This will be sufficient to ensure adequate coherency and adherency of the film. Furthermore, the films of this invention can be adhered to substrates via condensations other than that depicted above, e.g., with amino groups. Hence, this invention has the widest application.

Similarly, there is no limitation on the shape of the substrate surface to which the films of this invention can be applied. It is particularly applicable in situations where the substrate has a complex shape in view of the abnormally high adherency which is achieved by this invention due to the excellent wetting properties of the film.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

EXAMPLE 1

Silicon tetraethoxide (315 ml), absolute ethanol (315 ml), 1N HCL (20 drops) and $H_2O$ (26 ml) were combined in a reaction flask at 60° C. After stirring for 1.5 hours, the solution was cooled to 30° C. and $H_2O$ (231 ml) was re-added. This solution was reacted under reflux for 30 min. and then diluted 5:1 with absolute ethanol. To 100 ml of this solution, 20 gms of powdered (−400 mesh) glass of the following composition were added: (wt %).

$SiO_2$: 40.4
$TiO_2$: 18.1
$Al_2O_3$: 2.5
CaO: 3.5
MgO: 2.2
$Na_2O$: 12.1
$K_2O$: 21.1

This solution was applied to copper substrates by a dipping operation followed by air drying. The substrates were heated to 1000° C. in a flowing $N_2$ atmosphere. This treatment resulted in a uniform glass coating 25 μm in thickness with a resistivity greater than $8 \times 10^6 \Omega \cdot cm$.

EXAMPLE 2

Silicon tetraethoxide (61 ml), absolute ethanol (61 ml), 1N HCl (4 drops) and $H_2O$ (5 ml) were combined in a reaction flask at 60° C. for 1 hour. The solution was cooled to 40° C. and Al-sec-butoxide (8.7 g) dissolved in isopropanol (9.0 ml), $H_2O$ (2.2 ml) and trimethyl borate (13.4 ml) were added. After 1 hour at 40° C., $H_2O$ (25.8 ml), acetic acid (4.0 ml) and barium acetate (5.36 ml) were added. This solution was diluted 4:1 with absolute ethanol and stirred for 30 min. To this solution was added the glass of the following composition (mol %).

$B_2O_3$: 40
$Al_2O_3$: 10
PbO: 40
CuO: 30 in the requisite amount required to produce a solution containing 5 wt % equivalent oxides. This solution was applied to glass and silicon substrates by a dipping process. After heating at 600° C., a film <1 μm in thickness was obtained.

The preceding examples can be repeated with similar success by substituting the generically or specifically described reactnats and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A method for coating a substrate with a glass-like film comprising, applying to the substrate, an aqueous alcoholic solution containing a polymeric network of partially hydrolyzed metal alkoxide into which network there is incorporated finely powdered glass, whereby there is achieved on the substrate a coherent and adherent initial film; and heating said film to a temperature sufficient to melt said powdered glass component, thereby converting said initial film to a final densified film.

2. A method of claim 1 further comprising preparing said solution by reacting said finely powdered glass with an aqueous alcoholic solution of partially hydrolyzed metal alkoxide.

3. A method of claim 2 wherein said aqueous alcoholic solution of partially hydrolyzed metal alkoxide further comprises an acid, a base or a system compatible alkali metal or alkaline earth metal salt and is prepared by holding said solution at a temperature of from room temperature to 80° C. for a time sufficient to hydrolyze said alkoxide and form a polymeric network of hydrolyzed and condensed alkoxide.

4. A method of claim 3 wherein said aqueous alcoholic solution containing a polymeric network of partially hydrolyzed metal akoxide into which network there is incorporated finely powdered glass, comprises the following relative proportions of ingredients: 50–500 g total of metal alkoxide and alkali or alkaline earth metal salt, wherein up to 50% of this amount is provided by the latter salt; 1,000–10,000 g of alcohol; 10–500 g of water; 10–100 g of said glass; if an acid is included, sufficient acid to provide a pH of 1–2.5; and if a base is included, sufficient base to provide a pH of 6–9.

5. A method of claim 4 wherein said metal alkoxide is a $C_{1-4}$-alkoxide of B, Al, Ti, Si or Zr; said alcohol is a $C_{1-4}$-alkanol; and said powdered glass is a silicate or phosphate-based glass.

6. A method of claim 4 wherein said powdered glass has a particle size of about 200–400 mesh.

7. A method of claim 4 wherein said aqueous alcoholic solution of partially hydrolyzed metal alkoxide has a pH of 1–2.5 which is provided by addition of HCl or $HNO_3$.

8. A method of claim 1 wherein said solution is applied to the substrate by a dipping, spraying or spinning technique.

9. A method of claim 1 wherein said final film has a thickness of 0.1–100 $\mu$m.

10. A method of claim 4 wherein said final film has a thickness of 0.1–100 $\mu$m.

11. A method of claim 10 wherein said powdered glass has a softening point of 400°–1,000° C.

12. A method of claim 4 wherein said powdered glass is a powdered dehydrated glass-like gel prepared by drying an aqueous alcoholic solution containing a polymeric network of partially hydrolyzed metal alkoxide, thereby preparing a dehydrated glass-like gel and then grinding the latter to form a powder.

13. A method of claim 4 wherein the substrate is a glass, a metal, a semiconductor or a ceramic.

14. A method of claim 13 wherein the substrate is Cu, Ni, Al or a semiconductor.

15. A method of claim 1 wherein the initial film is heated at a temperature of from the softening point of the powdered glass up to 50° C. thereabove.

16. A method of claim 11 wherein the initial film is heated at a temperature of from the softening point of the powdered glass up to 100° C. thereabove.

17. A coated substrate prepared by the process of claim 1.

18. A coated substrate prepared by the process of claim 10.

19. A coated substrate prepared by the process of claim 11.

* * * * *